United States Patent [19]
Gatsis

[11] 3,928,179
[45] Dec. 23, 1975

[54] PROCESS FOR HYDROREFINING A RESIDUAL HYDROCARBON

[75] Inventor: John G. Gatsis, Des Plaines, Ill.

[73] Assignee: Universal Oil Products Company, Des Plaines, Ill.

[22] Filed: Oct. 16, 1974

[21] Appl. No.: 515,374

Related U.S. Application Data

[60] Division of Ser. No. 386,137, Aug. 6, 1973, which is a continuation-in-part of Ser. No. 263,367, June 5, 1972, abandoned.

[52] U.S. Cl. ............................................. 208/213
[51] Int. Cl.² ...................................... C10G 23/02
[58] Field of Search .................. 208/213, 209, 215; 252/435

[56] References Cited
UNITED STATES PATENTS

| | | | |
|---|---|---|---|
| 3,156,707 | 11/1964 | Kerr | 252/435 |
| 3,278,421 | 10/1966 | Gatsis | 208/213 |
| 3,625,863 | 12/1971 | Heller et al. | 252/435 |
| 3,657,111 | 4/1972 | Gleim | 208/213 |
| 3,796,671 | 3/1974 | Gleim | 208/213 |

Primary Examiner—Delbert E. Gantz
Assistant Examiner—G. J. Crasanakis
Attorney, Agent, or Firm—James R. Hoatson, Jr; Thomas K. McBride; William H. Page, II

[57] ABSTRACT

A process for hydrorefining a residual hydrocarbon charge stock utilizing a catalyst comprising a refractory inorganic oxide containing from about 2 to about 30 weight percent Group V-B metal oxide and from about 1 to about 25 weight percent phosphorous oxide in a weight ratio of from about 1:1 to about 2:1.

3 Claims, No Drawings 3,928,179

PROCESS FOR HYDROREFINING A RESIDUAL HYDROCARBON

RELATED APPLICATION

The present application is a division of my copending application, Ser. No. 386,137 filed Aug. 6, 1973 which is, in turn, a continuation-in-part of my application, Ser. No. 163,367 filed June 5, 1972, now abandoned, all the teachings of these applications are incorporated herein by specific reference thereto.

This invention relates to a process particularly adapted to the hydrorefining of residual oils. Residual oils are the liquid or semiliquid products recovered as a non-distillable bottoms fraction or residue in the distillation of petroleum. The residual oils are highly carbonaceous refractory materials variously referred to as asphaltum oil, liquid asphalt, black oil, petroleum tailings, residuum, residual reduced crude, vacuum bottoms, and the like. Undesirable nitrogenous and sulfurous compounds which invariably occur in residual oils are generally reduced to an acceptable level at hydrorefining conditions whereby they are converted to ammonia and hydrogen sulfide which are readily separated as gaseous products. However, any substantial conversion of $C_7$-insoluble asphaltenes and other hydrocarbonaceous matter, constituting the bulk of the residual oil, to more valuable distillable petroleum products is somewhat more difficult.

A successful hydrorefining operation is measured not only by the extent to which the residual oil feedstock is converted to a distillable product but also to the character of the bottoms fraction remaining after separation of the distillable product and recycled as a portion of said feedstock in the course of the hydrorefining process. Thus, an unconverted bottoms material, generally boiling in excess of about 565°C., and characterized by an API greater than about 12, a hydrogen content in excess of about 11 weight percent, and less than about 1 weight percent sulfur, has a stabilizing influence on the hydrorefining process and slows deactivation of the hydrorefining catalyst.

It is an object of this invention to present a novel catalyst composite particularly adapted to the hydrorefining of residual oils consisting of a refractory inorganic oxide containing from about 2 to about 30 weight percent Group V-B metal oxide and from about 1 to about 25 weight percent phosphorous oxide in a weight ratio of from about 1:1 to about 2:1 characterized in that said composite is prepared by combining an aqueous solution of a soluble Group V-B metal compound and phosphoric acid, contacting a slurry of a refractory inorganic oxide hydrogel with the resulting aqueous solution, drying the resulting impregnated hydrogel and calcining the dried composite in an oxidizing atmosphere at a temperature of from about 315°C. to about 650°C. In one of its broad aspects, the present invention embodies a catalyst comprising a refractory inorganic oxide containing from about 2 to about 30 weight percent Group V-B metal oxide and from about 1 to about 25 weight percent phosphorous oxide in a weight ratio of from about 1:1 to about 2:1.

Another embodiment of the present invention is in a method of catalyst manufacture which comprises preparing an aqueous solution of a soluble Group V-B metal compound and phosphoric acid, contacting a slurry of a refractory inorganic oxide hydrogel with the resulting aqueous solution, drying the resulting impregnated hydrogel, and calcining the dried composite in an oxidizing atmosphere at a temperature of from about 315° to about 650°C.; the Group V-B metal compound and phosphoric acid being utilized in an amount to provide a final catalyst composite containing from about 2 to about 30 weight percent Group V-B metal oxide, and from about 1 to about 25 weight percent phosphorous oxide, said Group V-B metal oxide and phosphorous oxide being in a weight ratio of from about 1:1 to about 2:1.

Still another object of this invention is to present a process for hydrorefining a residual hydrocarbon charge stock which comprises reacting said charge stock with hydrogen in contact with a catalyst prepared by combining an aqueous solution of a soluble Group V-B metal compound and phosphoric acid, contacting a slurry of a refractory inorganic oxide hydrogel with the resulting aqueous solution, drying the resulting impregnated hydrogel and calcining the dried composite in an oxidizing atmosphere at a temperature of from about 315° to about 650°C., the Group V-B metal compound and phosphoric acid being utilized in an amount sufficient to provide a final catalyst composite containing from about 2 to about 30 weight percent Group V-B metal oxide, and from about 1 to about 25 weight percent phosphorous oxide, said Group V-B metal oxide and phosphorous oxide being in a weight ratio of from about 1 to about 2.

Other objects and embodiments of this invention will become apparent in the following detailed specification.

The refractory inorganic oxides which may be utilized as a component of the catalyst of this invention include alumina, silica, zirconia, thoria, boria, and the like, or combinations thereof, particularly alumina in combination with one or more other refractory inorganic oxides. The refractory inorganic oxide employed herein preferably comprises alumina composited with silica. The alumina is suitably composited with silica in a weight ratio of from about 1.5:1 to about 9:1, although from about a 3:1 to about a 9:1 weight ratio is preferred.

Several methods are available for preparing alumina composited with silica. One method commonly employed comprises acidifying an aqueous water glass (sodium silicate) solution to form a silica hydrosol. The sol is aged under acidic conditions and then under basic conditions to form a hydrogel of desirable pore characteristics. The silica hydrogel is then impregnated with an aqueous solution of a hydrolyzable aluminum salt and treated at conditions to effect hydrolysis and precipitation of alumina in intimate combination with the silica. More specifically, an aqueous water glass solution, suitably containing from about 5 to about 15 weight percent silica, is acidified with a mineral acid such as hydrochloric acid, sulfuric acid, and the like, to form a silica sol. The volumetric quantities and concentrations of the reactants is such as to establish a pH of from about 3.5 to about 4.5, and to yield a sol containing from about 20 to about 30 grams of silica per liter. The sol is suitably acid aged for at least about 2 hours at a pH of from about 4 to about 4.8. The sol becomes increasingly viscous, and solidification is avoided by constant mixing and occasional dilution with water. Following the acid aging treatment, sufficient aqueous ammonium hydroxide, or other suitable alkaline reagent, is added to raise the pH to basic or near basic conditions, that is, to a pH of at least about 6.5 and preferably from about 7.0 to about 7.5, to promote gelation of the sol. After approximately one hour of basic aging, sufficient aluminum salt solution, e.g., aqueous aluminum sulfate solution, is admixed with the silica hydrogel to provide a desired alumina-silica weight ratio. The aluminum salt solution is admixed with the hydrogel at a pH of from about 3.0 to about 3.5, and after a thorough impregnation of the silica hydrogel, the pH is adjusted to 8.0–8.5 with aqueous ammonium hydroxide to hydrolyze the aluminum salt and precipitate alumina composited with the silica. The resultant aqueous slurry is filtered and the alumina-silica subjected to one or more water washings to reduce the soluble content to an acceptable level.

One preferred method of compositing alumina with silica comprises admixing the described aqueous solution of a hydrolyzable aluminum salt with the described acidified water glass, or silica sol, at a pH of from about 3 to about 3.5. The mixture is acid aged for at least about 2 hours with continuous mixing, the final pH being in the 4.0–4.8 range. The resultant mixture is then commingled with a basic precipitant, suitably an aqueous ammonium hydroxide solution, to adjust the pH in the range of from about 8.0 to about 9.0 whereby coprecipitation of alumina and silica is effected. As aforesaid, the resulting aqueous slurry is filtered and the alumina-silica product subjected to one or more water washings to reduce the soluble content thereof to an acceptable level.

The catalyst of this invention contains a refractory inorganic oxide, preferably alumina composited with silica in a weight ratio of from about 3:1 to about 9:1, and contains from about 2 to about 30 weight percent Group V-B metal oxide and from about 1 to about 25 weight percent phosphorous oxide. The presence of the Groups V-B metal oxide and phosphorous oxide in a weight ratio of from 1:1 to about 2:1 as herein contemplated, is in part responsible for the improved activity exhibited by the catalyst of this invention with respect to the hydrorefining of residual oils.

The prior art, viz., U.S. Pat. No. 2,773,838, has taught a catalyst for the vapor phase partial oxidation of non-aromatic, unsaturated hydrocarbons prepared by reacting ammonium metavanadate with phosphoric acid in an aqueous solution in the presence of an inert carrier followed by removal of the supernatant liquid by evaporation, drying and calcining.

However, I have discovered that if the ammonium metavanadate is combined with phosphoric acid and then contacting the resulting mixture with a refractory inorganic oxide hydrogel, an unexpectedly superior, hydrorefining catalyst is produced.

It should also be noted that U.S. Pat. No. 3,105,812 teaches a process for reducing the nitrogen content of a nitrogen-containing petroleum fraction which comprises contacting said nitrogen-containing petroleum fraction with an oxygen-containing gas in the presence of a solid catalyst comprising a mixture of the oxides of phosphorous and vanadium. The patentee notes that although a phosphorous and vanadium catalyst is satisfactory for nitrogen removal, sulfur removal was not great.

By comparison, the catalyst as prepared by my invention not only reduces the nitrogen content of the charge stock but also substantially reduces the sulfur and heptane insoluble concentration.

The ammonium meta-vanadate or any other water soluble compound of the Group V-B may be used to serve as a precursor of the metallic component such that, upon subsequent heating of the impregnated carrier material at conditions effecting decomposition of said compound, the desired metallic component is formed on the carrier material.

The catalyst of this invention is prepared to contain as metallic components, an oxide of a metal of Group V-B in combination with an oxide of phosphorus. The catalyst will thus contain an oxide of vanadium, niobium, and/or tantalum in combination with an oxide of phosphorus. The catalyst will preferably contain an oxide of vanadium, especially vanadium pentoxide, in combination with the phosphorous pentoxide. In the latter case, the impregnating solution is conveniently a common aqueous solution of ammonium meta-vanadate and phosphoric acid as precursor compounds of the vanadium and phosphorous pentoxides. Other suitable precursor compounds include vanadium tribromide, vanadium dichloride, vanadium trichloride, vanadium tetrachloride, vanadium sesquioxide, vanadyl sulfate, tantalic acid, niobium oxychloride, etc.

Impregnation of the refractory inorganic oxide hydrogel can be accomplished whereby the refractory inorganic oxide hydrogel is soaked, dipped, suspended, or otherwise immersed in the previously combined impregnating solution. One suitable method comprises admixing the refractory inorganic oxide hydrogel with the previously combined impregnating solution to form a slurry, utilizing a minimum volume of impregnating solution commensurate with an even distribution of the catalytic components thereon. The resultant slurry is then treated at conditions to evaporate the impregnating solution in contact with refractory inorganic oxide hydrogel. Evaporation of the impregnating solution may be effected utilizing a steam jacketed rotary steam dryer whereby the refractory inorganic oxide hydrogel is tumbled in the solution by the rotary motion of the dryer, and evaporation is expedited by the application of steam to the dryer jacket. Alternatively, the slurry may be subjected to spray drying, the slurry being sprayed in an atomized state into a tower of hot inert gases whereby a rapid evaporation occurs and dried particles of a predetermined size range fall out of the spray, or the slurry may be oven dried to evaporate the impregnating solution in contact with the refractory inorganic oxide hydrogel under relatively quiescent conditions. In any case, the dried composite is subsequently calcined in an oxidizing atmosphere, suitably air, at a temperature of from about 315° to about 650°C., and effective to decompose the impregnated Group V-B metal compound and phosphorous compound to their respective oxides.

In the hydrorefining of residual oils in contact with the catalyst of this invention, the oxidized catalyst is preferably presulfided prior to contact with the residual oil at hydrorefining conditions. Suitably, a sulfur-containing feedstock and hydrogen are passed in contact with the oxidized catalyst at a temperature of about 240°C. with the temperature being gradually raised to a hydrorefining temperature of from about 260° to about 430°C. at a rate to minimize the exothermic heat of the sulfidation. The hydrorefining process is effected by reacting the residual oil feedstock with hydrogen in contact with the sulfided catalyst at a temperature of from about 260° to about 430°C. The charge stock admixed with hydrogen is heated and passed in contact with the catalyst under an imposed hydrogen pressure of from about 500 to about 5000 psig. at a liquid hourly space velocity of from 0.5 to about 2.0. The total reaction zone effluent is passed to a high pressure — low temperature separator in which a gaseous phase rich in hydrogen is removed and recycled to combine with the residual oil charge. Remaining normally liquid reaction zone effluent is then introduced into a suitable fractionator for the separation of distillable products and the unconverted bottoms material recycled as a portion of the residual oil feedstock.

The catalyst composition of this invention is also useful as a catalyst to effect a number of hydrocarbon conversion reactions. Hydrocarbon conversion reactions herein contemplated include the polymerization of olefins, particularly ethylene, propylene, 1-butene, 2-butene, isobutylene and also higher boiling olefins, at polymerization reaction conditions; the alkylation of isoparaffins with olefins or other alkylating agents including, for example, alkylhalides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, amylenes, and higher boiling olefins including nonenes, decenes, undecenes, etc., the foregoing alkylation reactions being effected at alkylation conditions disclosed in the art. The catalyst composite of this invention is also useful as a catalyst or as a catalyst support in the isomerization of paraffins, particularly n-butane, n-pentane, n-hexane, n-heptane, n-octane, etc., or mixtures thereof, including isomerization of less highly branched chain saturated hydrocarbons to more highly branched chain saturated hydrocarbons such as the isomerization of 2- or 3-methylpentane to 2,3- and 2,2-dimethylbutane; isomerization of dimethylcyclohexane to methylcyclohexane, isomerization of methylcyclopentane to cyclohexane, etc., at isomerization reaction conditions. The catalyst composite is also useful as a catalyst or component thereof for the elimination of products of incomplete combustion occurring in the hydrocarbonaceous exhaust gases which emanate from an internal combustion engine, or occurring in industrial waste gases.

One of the preferred embodiments of the present invention relates to a catalyst comprising alumina composited with silica in a weight ratio of from about 3:1 to about 9:1, said alumina-silica containing from about 10 to about 20 weight percent vandium pentoxide and from about 5 to about 15 weight percent phosphorous pentoxide impregnated thereon in a weight ratio of from about 1:1 to about 2:1. The following example is presented in illustration of the preferred embodiment and is not intended as an undue limitation on the generally broad scope of the invention as set out in the appended claims.

EXAMPLE I 382 grams of water glass (27.0% SiO$_2$) was diluted with 760 milliliters of water and acidified by slowly adding the same to 100 milliliters of concentrated hydrochloric acid diluted with 200 milliliters of water. The acidified solution was admixed with 8700 milliliters of an aqueous Al$_2$SO$_4$ solution containing the equivalent of 9.35 grams of Al$_2$O$_3$/100 milliliters. The resulting solution was then slowly added to a vigorously stirred aqueous NH$_4$OH solution consisting of 3.5 liters of concentrated NH$_4$OH diluted to 7 liters with water. The final pH was 9.0. The precipitated product was recovered by filtration, water-washed, and reslurried in water. The last mentioned slurry was thereafter admixed with an impregnating solution which had previously been prepared by dissolving 262 grams of NH$_4$VO$_3$ in 4000 grams of boiling water and adding 258 grams of 85% H$_3$PO$_4$ thereto. The impregnated material was oven dried at 125°C., crushed and screened to 10–30 mesh, and calcined in air at 593°C. for 2 hours. The calcined particles contained 63.6% Al$_2$O$_3$, 8.1% SiO$_2$, 15.9% V$_2$O$_5$, and 12.4% P$_2$O$_5$, and had an average bulk density of 0.283 grams/cc.

About 20 grams of the described catalyst particles and 200 grams of Wyoming vacuum tower bottoms were sealed in an 1800 cc. glass-lined rotating autoclave. 34 grams of H$_2$S was pressured into the autoclave and the pressure brought to 100 atmospheres at room temperature with hydrogen. The temperature was raised to 430°C. and the autoclave rotated at this temperature for two hours. The autoclave was thereafter cooled to room temperature and depressured. Product analyses are presented below in comparison with the charge stock analyses.

|  | Charge Stock | Product |
|---|---|---|
| API | 6.2 | 27.3 |
| % C$_7$ insol | 10.79 | 0.44 |
| % H$_2$ | 10.10 | 12.08 |
| % S | 4.31 | 0.86 |
| % N | 0.55 | 0.20 |
| % Distillable | 37.5 | 95.0 |

The following examples are presented to compare the hydrorefining ability of the catalysts prepared according to U.S. Pat. Nos. 2,773,838 and 3,105,812 with that of the present invention.

EXAMPLE II

A catalyst was prepared according to Example I of U.S. Pat. No. 2,773,838 whereby 1444 grams of 85% H$_3$PO$_4$ was mixed with 2800 cc. of distilled water and cooled to room temperature. 915.2 grams of NH$_4$VO$_3$ was then added and dissolved. This solution was heated and after precipitation occurred, the supernatant liquid was removed by evaporation, the remaining solids were oven dried for 4 hours at 400°F., following which the dried solids were ground to pass 35 mesh. The ground solids were then pelleted and the pellets were calcined in an air stream in a muffle furnace for one-half hour at 700°F., one-half hour at 800°F. and 6 hours at 900°F.

About 20 grams of the described catalyst particles and 200 grams of Wyoming vacuum tower bottoms were sealed in an 1800 cc. glass-lined rotating autoclave. 34 grams of H$_2$S was pressured into the autoclave and the pressure brought to 100 atmospheres at room temperature with hydrogen. The temperature was raised to 430°C. and the autoclave rotated at this temperature for two hours. The autoclave was thereafter cooled to room temperature and depressured. Product analyses are presented below in comparison with the charge stock analyses.

|  | Charge Stock | Product |
|---|---|---|
| API | 6.2 | 19.8 |
| % C$_7$ Insoluble | 10.79 | 3.96 |
| % H$_2$ | 10.10 | 10.27 |
| % S | 4.31 | 2.87 |

| | Charge Stock | Product |
|---|---|---|
| % N | 0.55 | 0.54 |

EXAMPLE III

A catalyst was prepared according to U.S. Pat. No. 3,105,812 and contained 1.5 weight percent phosphorous pentoxide and 0.5 weight percent vanadium pentoxide. About 20 grams of the described catalyst particles were subjected to a hydrorefining experiment identical with that in Examples I and II. Product analyses are presented below in comparison with the charge stock analyses.

| | Charge Stock | Product |
|---|---|---|
| API | 6.2 | 16.9 |
| % C$_7$ Insoluble | 10.79 | 4.64 |
| % H$_2$ | 10.10 | 10.07 |
| % S | 4.31 | 3.20 |
| % N | 0.55 | 0.34 |

Comparison of the product analyses of Examples II and III with those of Example I clearly indicates that the catalyst of this invention (Example I) is superior for the hydrorefining of hydrocarbons.

I claim as my invention:

1. A process for hydrorefining a residual hydrocarbon charge stock which comprises reacting said charge stock with hydrogen in contact with a catalyst prepared by combining an aqueous solution of a soluble Group V-B metal compound and phosphoric acid, contacting a slurry of a refractory inorganic oxide hydrogel with the resulting aqueous solution, drying the resulting impregnated hydrogel and calcining the dried composite in an oxidizing atmosphere at a temperature of from about 315° to about 650°C., the Group V-B metal compound and phosphoric acid being utilized in an amount sufficient to provide a final catalyst composite containing from about 2 to about 30 weight percent Group V-B metal oxide, and from about 1 to about 25 weight percent phosphorous oxide, said Group V-B metal oxide and phosphorous oxide being in a weight ratio of from about 1 to about 2.

2. The process of claim 1 further characterized in that said residual hydrocarbon charge is reacted with hydrogen at a temperature above about 260°C. and under a pressure of from about 500 to about 5,000 psig.

3. The process of claim 1 further characterized in that said Group V-B metal compound is a compound of vanadium.

* * * * *